Sept. 1, 1970 N. P. KONING 3,526,344

PLANTER

Filed Sept. 11, 1968

INVENTOR

NICOLAAS P. KONING

BY

ATTORNEYS

United States Patent Office 3,526,344
Patented Sept. 1, 1970

3,526,344
PLANTER
Nicolaas Petrus Koning, Hobbemalaan 64,
Alkmaar, Netherlands
Filed Sept. 11, 1968, Ser. No. 758,948
Claims priority, application Netherlands, Sept. 4, 1967,
6712610
Int. Cl. B65g 47/19
U.S. Cl. 222—196                              4 Claims

ABSTRACT OF THE DISCLOSURE

For accurately regulating the feed of seed tubers such as potatoes or bulbs into a planting base a lying plate is disposed, adjacent the top of a conveyor belt, is borne on springs, performs a vibrating movement in the longitudinal direction and extends a short distance below the front wall of the storage tank, whereby on both longitudinal edges of the conveyor belt guides are disposed which so bend the top of the belt into a trough outline that at the rear end of the belt, the sides of the trough are disposed at the same height as the vibrating plate or higher.

---

The invention relates to a planter for planting seed tubers such as bulbs, potatoes and similar plants, in which a lying feeding conveyor belt which supplies a planting base is disposed below a storage tank borne by a displeaceable frame.

To enable a planter of the kind specified to plant bulbs of different kinds, the feed of bulbs must be accurately regulated, to which end the speed of the feeding conveyor belt must be variable.

It is an object of the invention to improve the accuracy of the regulation. According to the invention, disposed adjacent the top of the conveyor belt is a lying plate which is borne on springs and performs a vibrating movement in the longitudinal direction, the plate extending a short distance below the front wall of the storage tank, and disposed on both longitudinal edges of the conveyor belt are guides which so bend the top of the belt into a trough outline that at the rear end of the belt, the sides of the trough are disposed at the same height as the vibrating plate or higher. In this construction, in which a vibrating plate is conveniently disposed on either side of the feeding conveyor belt, excess bulbs on the belt are returned by the vibrating plate or plates to the storage tank, in which they are retained by the tank front wall.

An embodiment of the invention will now be described in greater detail with reference to the drawings.

Figure 1:
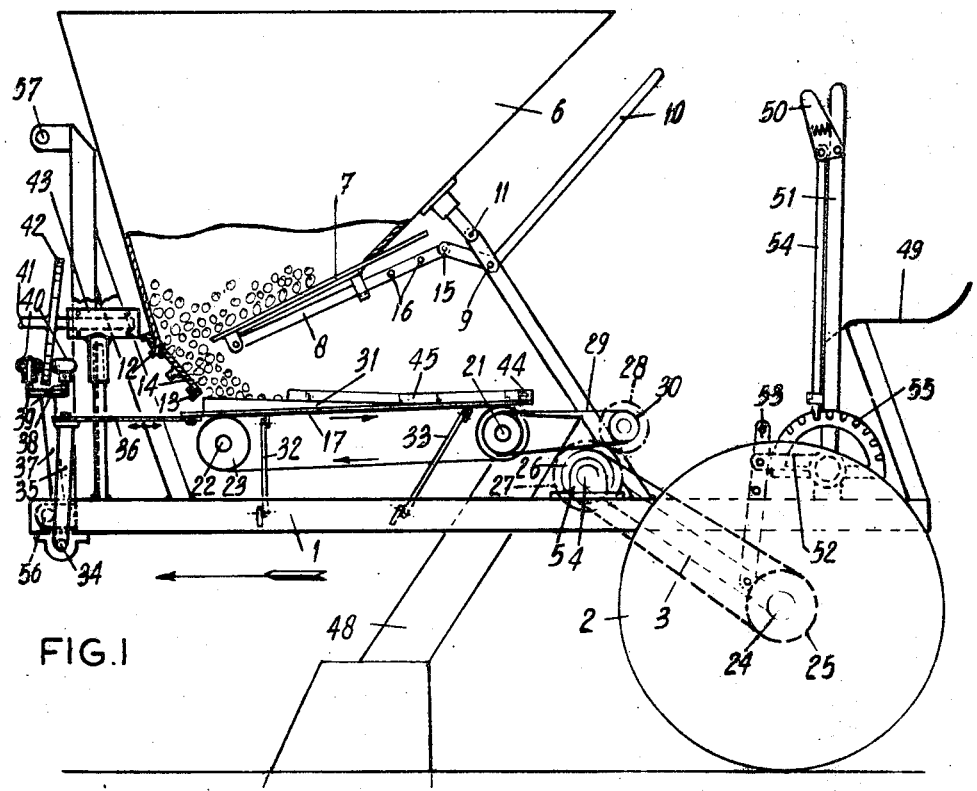
FIG. 1 is a side elevation of the planter, partly in vertical section.

Referring to the drawings, the planter has a frame 1 borne at its rear side by a pair of wheels 2 with the interposition of a pair of arms 3 pivotable around a pivot 4 which is borne on the frame 1 in bearings 5.

The bulbs to be planted are disposed in a storage tank or hopper 6 which is borne on the frame 1 and whose outlet can be regulated by a flap 7 attached to a rod 8, with which a pivotable operating lever 10 engages at a place 9 for the displacement of the flap 7. The tank 6 has a hinge 11 attaching it to the frame 1 and bears via the lower edge of its front wall against a corner of a cruciform section 12. A deflector plate 14 mobile in the transverse direction is borne between the cruciform section 12 and a T-section 13. By disposing a rapidly releasable coupling pin 15 at the place of connection between the lever 10 and the rod 8, after the removal of the pin 15 the tank can be hinged freely for cleaning purposes when turning over to a different kind of plant. The rod 8 is formed with a number of orifices 16 for the insertion of the pin 15, so that the flap 7 can be adjusted independently of the operating lever 10.

Extending below the storage tank 6 are one or more supply means including feeding conveyor belts 17; disposed on the outside of the or each belt is a plate 18 which performs a vibrating movement in the longitudinal direction of the machine and returns any excess bulbs entrained on the belt 17, the bulbs being retained while being returned on the plates 18 by the T-section 13 of the deflector plate 14. Disposed on the inside of the belt 17 is a strip 19 by means of which the belt runs in the groove of a rope pulley 20 attached to a spindle 21. The other end pulleys 23 of the feeding conveyor belt 17 are freely rotatable around a spindle 22.

Figure 2:
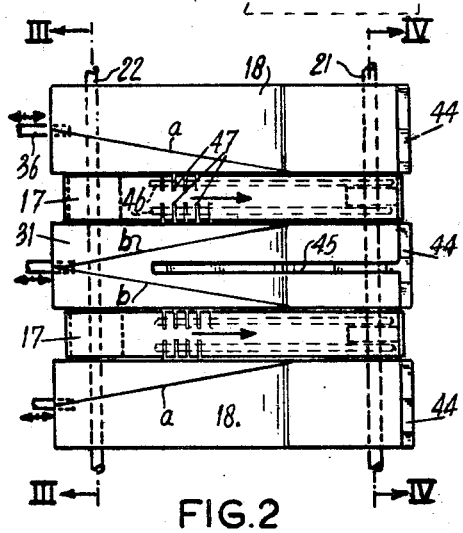
FIG. 2 is a plan view of a pair of feeding conveyor belts with their associated vibrating plates.
Figure 3:
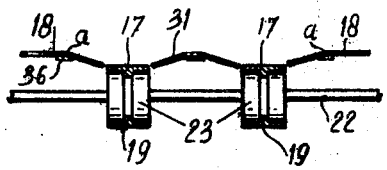
FIG. 3 is a cross-section through the belts and vibrating plates, taken along the line III—III in FIG. 2.

To drive the feeding conveyor belts 17, a chain or rope pulley 25 is attached to the wheel axle 24, to which at least one of the wheels 2 is attached, the pulley 25 driving a pair of chain or rope pulleys 26 and a gearwheel 27 attached thereto, all these members being freely rotatable around the pivot 4. The gearwheel 27 engages in a gearwheel 28 which drives, via a stepped rope pulley 30 with a rope 29, the spindle 21 of the rope pulleys 20 of the feeding conveyor belts 17, so that the same are moved in the direction shown by the arrows in FIGS. 1 and 2.

Disposed between the belts 17 is a vibrating plate 31 which can also receive excess bulbs from the belts.

Just like the tops of the belts 17, the plates 18, 31 also rise slightly in the rearward direction, for instance, by about 8 degrees. The plates 18, 31 are borne by resilient straps 32, 33; for each plate at least one strap 33 is directed in its central position at an inclination of, for instance, 55°, namely at the place where the belt 17 releases the bulbs. Since in its central position the foremost resilient strap 32 stands substantially vertical, a short stroke of the plates 18, 31 causes substantially no increase in the size of the gap between the T-section 13 in the bottom of the front wall of the tank 7, and the top of the plates 18, 31, so that even small bulbs are unable to escape at this place.

For the vibration of the plates 18, 31 there is pivotably mounted below the frame 1 a shaft 34 which has three vertical arms 35, each arm being connected via a strap 36 to one of the plates 18, 31. Also attached to the shaft 34 is a vertical arm 37 which bears at its top a plate or flap 38 attached thereto, on which two vertical journals 39 are disposed. Conical rings 40 having corrugated outer surfaces pivot on the journals 93. Disposed between the conical rings is a disc 42 attached at an inclination to a drive shaft 41, the drive shaft 41 being mounted in bush 43. The shaft 41 can be driven directly, or with the interposition of a transmission, by the power take-off of a tractor, the rotation of the shaft 41 being converted by the disc 42 into a reciprocation of the plates 18, 31. The amplitude of the vibration of the plates can be altered by adjusting the shaft 41 of the disc 42 vertically in relation to the rings 40, to which end, for instance, the bush 43 can be adjusted.

The outer plates 18 are bent at their inner edges along the line a in the direction of the belt 17, and the central plate 31 is bent at both longitudinal edges along the lines b in the direction of the adjoining belts, the result being inclined surfaces. The plates 18, 31 have at their rear ends vertical edges 44, and the central plate 31 has in the centre, over a large amount of its length, a strip 45 which prevents the bulbs to be planted from being excessively pushed to one side by the vibration of the plate 31 when the planter is operating on sloping terrain.

The inclined attitude of the resilient strap 33 gives the bulbs disposed on the plates 18, 31 a component of movement toward the hopper.

Figure 4:
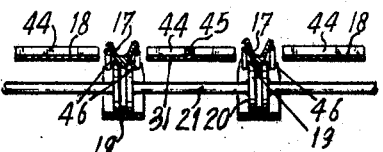
FIG. 4 is a corresponding cross-section, taken along the line IV—IV in FIG 2.

On either side of the feeding conveyor belt 17, disposed below the top of the belts, are adjustable guides 46 which force the belt to assume a trough-like shape, as shown in FIG. 4. If necessary, the longitudinal edges of the belts 17 can be formed with incisions 47 for bending into the form of a trough. Since the guides 46 adjacent the end pulley 20 extend to above the vibrating plates 18, 31, the trough walls of the belt 17 are also bent to above the plates 18, 31, so that the belt 17 can entrain a single row of bulbs to one or more feeder devices or planting base 48, but the excess bulbs are returned on the vibrating plates 18 or 31. At the rope pulley 23, where the belts 17 receive the bulbs, the belts 17 are lower than the flat portions of the plates 18, 31.

As regards the vertical adjustment of the planting foot 48: disposed near the driver's seat 49 is a lever 51 which has a handle 50 and engages via its horizontal arm 52 with a rod 53 connected to the arm 3, so that when the lever 51 is pivoted, the frame 1 and the planting foot 48 are raised in relation to the wheels 2. By means of the handle 50 and a locking rod 54, this vertical adjustment can be locked to a toothed segment 55.

The frame 1 has attachment places 56 and 57 for the lifting arms and connecting rod in the three-point suspension of the planter from a tractor.

It should be noted that the invention is not limited to the embodiment described hereinbefore, but can be modified in various ways. For instance, the planter can be constructed for only one row, or for more than two rows, in which case the planting feet are preferably offset in relation to one another in the longitudinal direction. Also, excess bulbs can be removed to the vibrating plates by a transversely moving sliding member of the feeding conveyor belt.

What I claim is:

1. In a planter more particularly adapted for planting seed tubers such as bulbs, potatoes, and the like, and including a frame adapted to be moved over a field during planting operations, a hopper mounted on said frame for containing seed and having a discharge, at least one feeder device having a seed inlet carried by said frame for depositing seed in the ground in a row as the frame is moved over a field, and supply means for transferring seed from said hopper discharge in selected sequence to said feed device seed inlet.

the improvement in said supply means comprising:

a flexible endless conveyor carried by said frame with one end disposed below said hopper to receive seed from said hopper discharge and the other end disposed to feed seed to said feeder device inlet, guide plates extending along each side of said conveyor and mounted on said frame for reciprocal vibratory movement longitudinally of said conveyor, means on said frame for vibrating said guide plates to cause seed thereon to move away from said feeder device inlet, and cam guides carried by said frame at each side of said conveyor adjacent the discharge end thereof to cause said conveyor to bend into a trough configuration to confine the seeds substantially to a single row as they are fed to the planter device inlet, the edges of the trough extending at least as high as the adjacent guide plates.

2. In a planter according to claim 1, said guide plates having their end portions beneath said hopper disposed above said conveyor with their surfaces adjacent said conveyor inclined downwardly toward said conveyor to funnel seed onto said conveyor.

3. In a planter according to claim 2, said plates each having an upstanding flange at its edge adjacent the discharge end of said conveyor to prevent seed from passing over said end.

4. In a planter according to claim 3, including a plurality of feeder devices mounted transversely of said frame, each having a conveyor associated therewith, there being a plurality of guide plates, one disposed along the outer edge of each outermost conveyor, and a further guide plate between adjacent edges of each pair of adjacent conveyors, each further guide plate each having an upstanding rib extending from its end flange at least partially along its length to prevent seed from moving laterally across said supply means when said frame is disposed at an angle.

References Cited

UNITED STATES PATENTS

| | | | |
|---|---|---|---|
| 1,778,622 | 10/1930 | Bergsten | 222—415 X |
| 2,689,597 | 9/1954 | Kinnean | 222—415 X |

ROBERT B. REEVES, Primary Examiner

H. S. LANE, Assistant Examiner

U.S. Cl. X.R.

198—57; 222—415